US 6,543,984 B1

(12) United States Patent
Hovey et al.

(10) Patent No.: US 6,543,984 B1
(45) Date of Patent: Apr. 8, 2003

(54) LENS TRANSFER METHOD AND DEVICES

(75) Inventors: Larry C. Hovey, Ontario, NY (US); Tom Carlock, Rochester, NY (US); Caoimhin S. Condren, Co. Waterford (IE); Paul Trotto, Honeoye Falls, NY (US); George L. Grobe, III, Pittsford, NY (US); Craig Alan Barrile-Josephson, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/540,786

(22) Filed: Mar. 31, 2000

(51) Int. Cl.⁷ .................................................. B29D 11/00
(52) U.S. Cl. ........................ 414/405; 414/810; 414/816
(58) Field of Search ................................ 414/403, 404, 414/405, 810, 816

(56) References Cited

U.S. PATENT DOCUMENTS

| 1,879,393 | A | * | 9/1932 | Miller ........................ 414/404 |
| 2,111,163 | A | * | 3/1938 | Yecny ......................... 34/282 |
| 3,637,416 | A | | 1/1972 | Misch et al. ................. 117/72 |
| 3,708,416 | A | | 1/1973 | Ruehlen et al. ............. 204/284 |
| 3,814,051 | A | | 6/1974 | Lewison ...................... 118/49 |
| 3,871,803 | A | * | 3/1975 | Beattie ........................ 249/82 |
| 4,055,378 | A | | 10/1977 | Feneberg et al. ........... 351/160 |
| 4,122,942 | A | | 10/1978 | Wolfson ..................... 206/5.1 |
| 4,143,949 | A | | 3/1979 | Chen ..................... 351/160 H |
| 4,214,014 | A | | 7/1980 | Hofer et al. .................. 427/40 |
| 4,312,575 | A | | 1/1982 | Peyman et al. ......... 351/160 H |
| 4,407,958 | A | * | 10/1983 | DeGraff, Jr. ................ 211/194 |
| 4,632,844 | A | | 12/1986 | Yanagihara et al. .......... 427/38 |
| 5,094,609 | A | * | 3/1992 | Kindt-Larsen .............. 206/5.1 |
| 5,143,660 | A | * | 9/1992 | Hamilton et al. ............. 156/69 |
| 5,326,584 | A | | 7/1994 | Kamel et al. ............... 427/491 |
| 5,503,515 | A | | 4/1996 | Moorehead .................. 414/755 |
| 5,578,331 | A | * | 11/1996 | Martin et al. ................. 134/66 |
| 5,706,634 | A | * | 1/1998 | Edwards et al. .............. 53/239 |
| 5,874,127 | A | | 2/1999 | Winterton et al. .......... 427/164 |
| 5,969,793 | A | | 10/1999 | Dobner ....................... 351/247 |

FOREIGN PATENT DOCUMENTS

| EP | 0825013 A1 | 2/1998 | .......... B29D/11/00 |
| EP | 0941829 A1 | 9/1999 | .......... B29C/33/30 |
| FR | 2416691 | 9/1979 | ............. A61L/3/00 |
| WO | 95/04609 | 2/1995 | |
| WO | 00/46016 | 8/2000 | .......... B29D/11/00 |
| WO | 01/32408 A2 | 5/2001 | .......... B29D/11/00 |

\* cited by examiner

*Primary Examiner*—Eileen D. Lillis
*Assistant Examiner*—Charles A. Fox
(74) *Attorney, Agent, or Firm*—Katherine McGuire

(57) ABSTRACT

A method, device and trays for transferring ophthalmic lenses from one work station to another. The first tray supports the lenses after release from the mold. The second tray supports the lenses during further processing including surface treatment. The articles are precisely placed and inverted as they are transferred from the first tray unto the second tray. Additionally, both sides of the ophthalmic lenses may be plasma reacted while supported on the second tray.

7 Claims, 12 Drawing Sheets

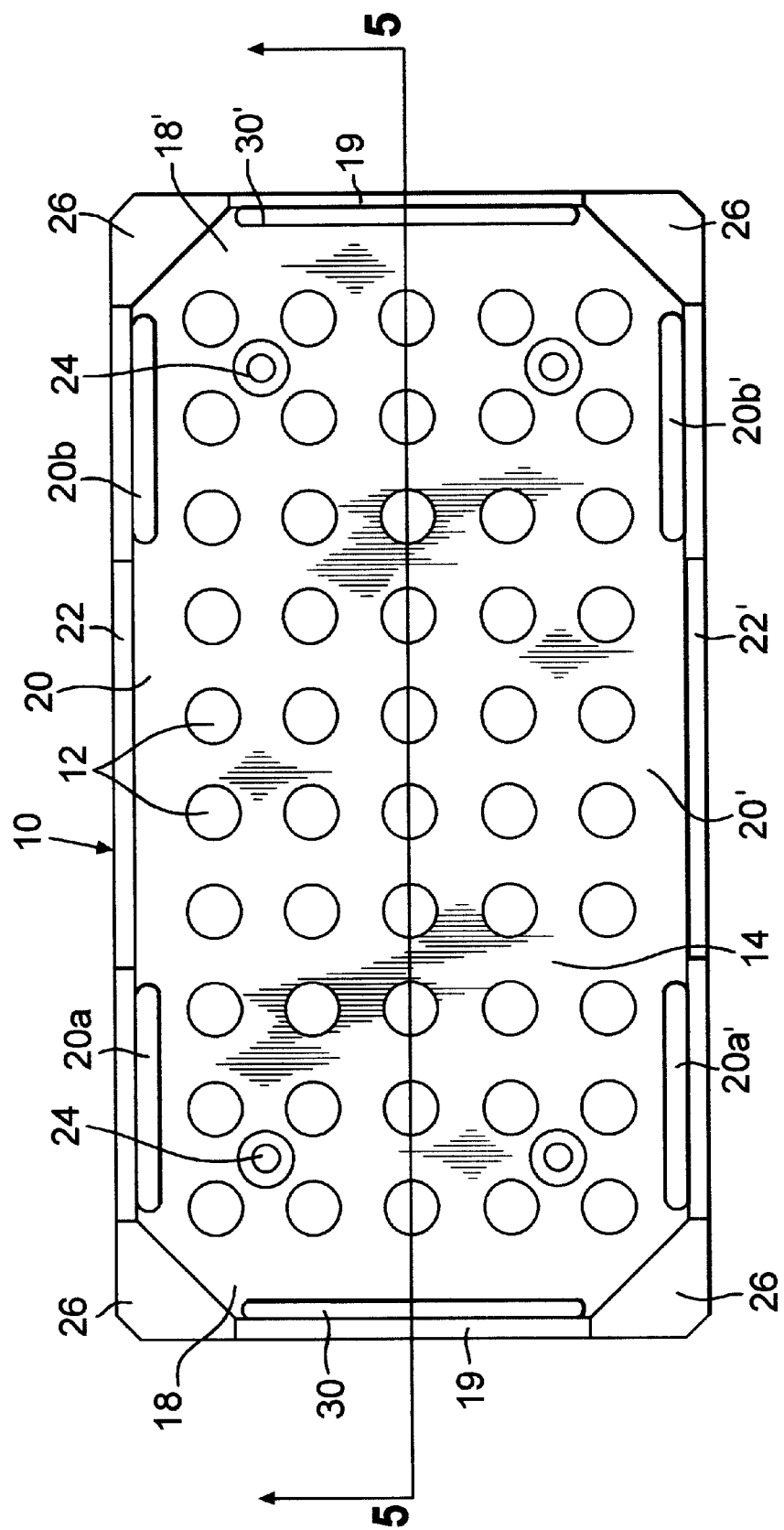

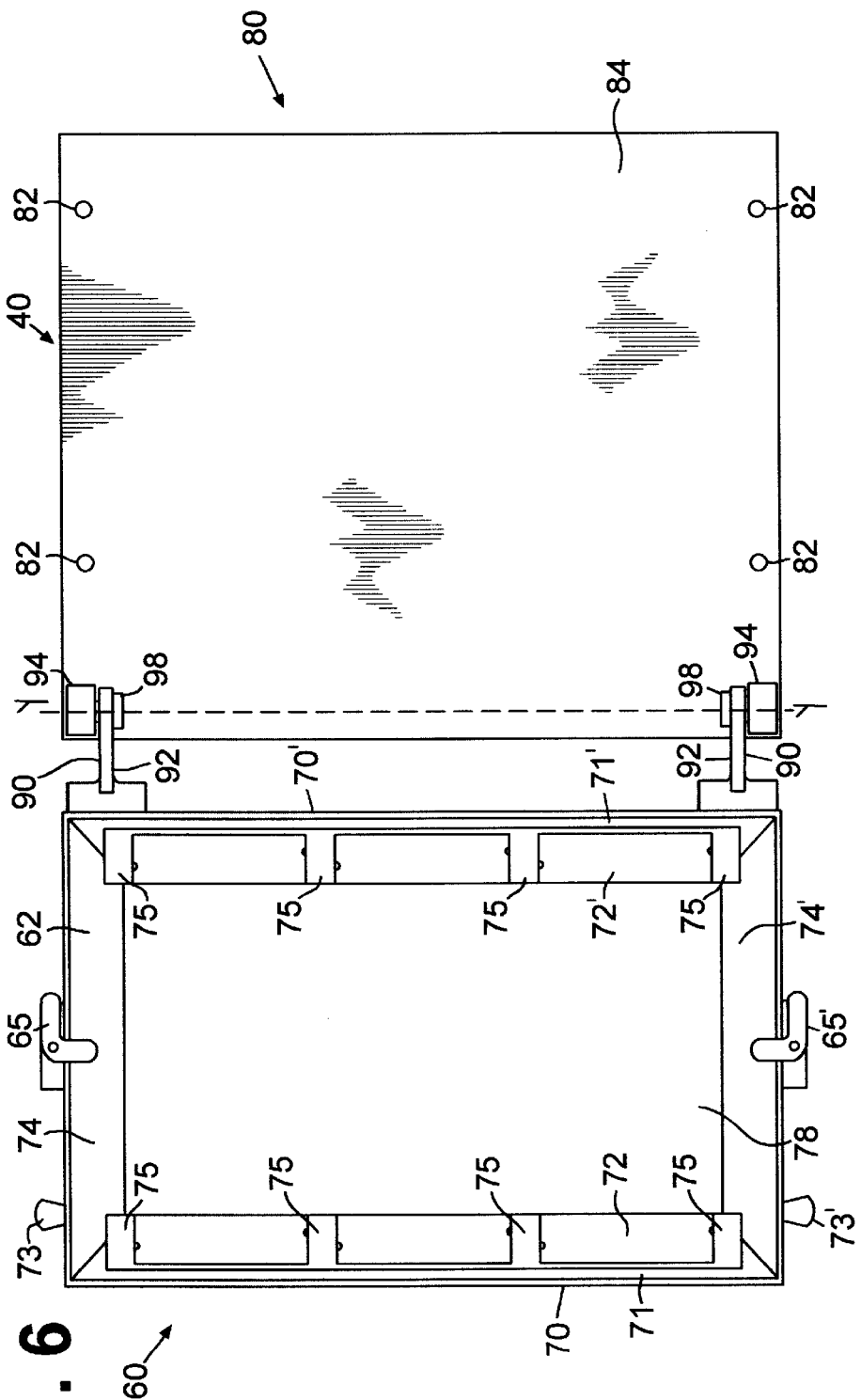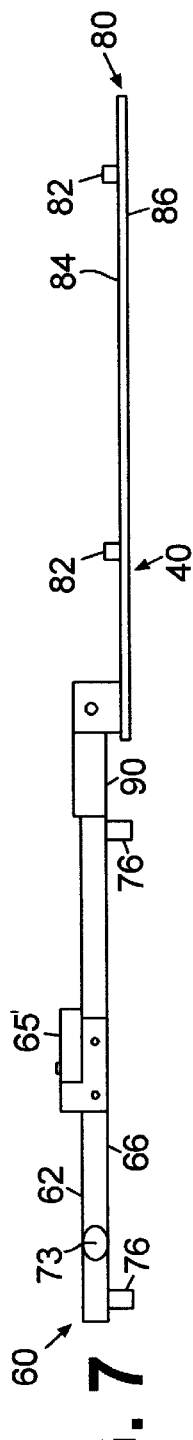

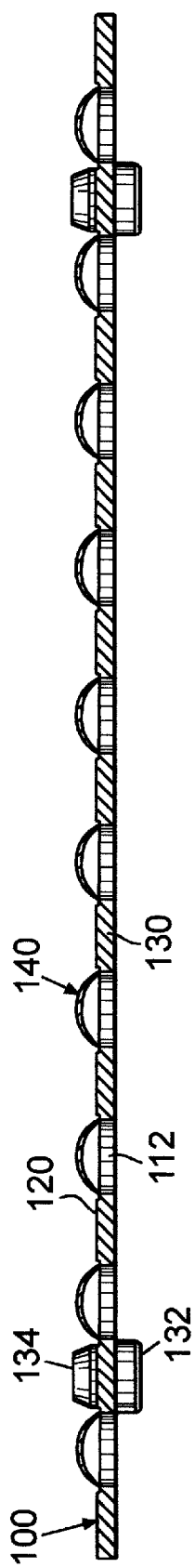
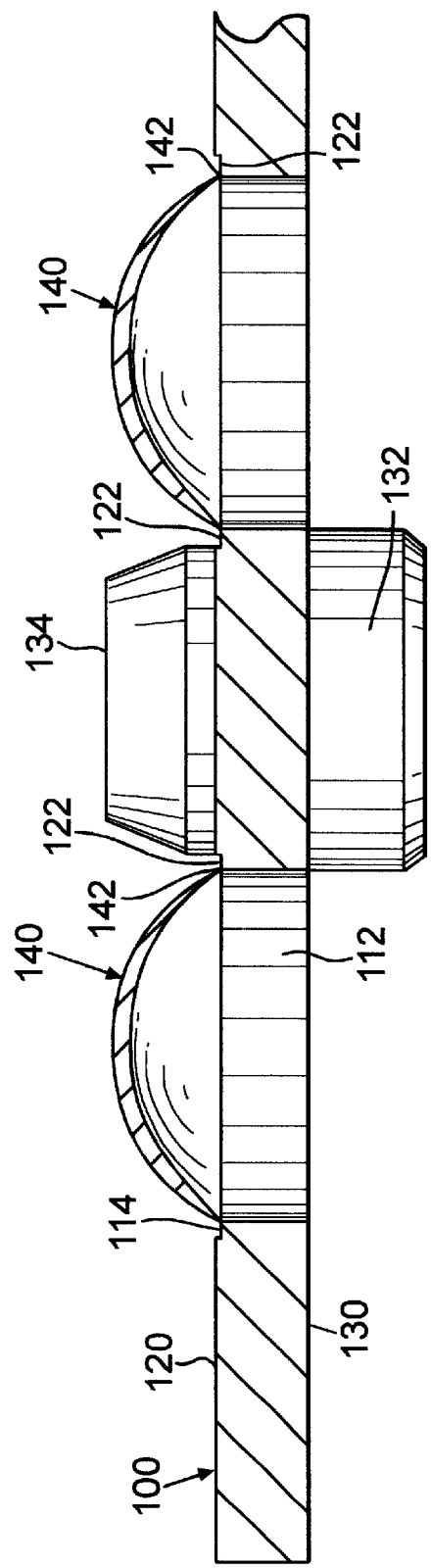
FIG. 9
FIG. 10

LENS TRANSFER METHOD AND DEVICES

BACKGROUND OF THE INVENTION

The present invention relates to a method of transferring ophthalmic lenses between treatment stations during manufacturing. Also disclosed and claimed are trays useful for transporting the lenses between stations. Included in this invention is a transfer tray for holding small, delicate articles such as contact lenses or intraocular lenses, a surface treatment support tray useful during gaseous processes, and a device for transferring the lenses from the transfer tray to the surface treatment support tray. In a preferred embodiment, contact lenses are transferred from a concave-side up position on the transfer tray to a concave-side down position on the surface treatment tray or vice-versa. The lenses are further subjected to a plasma reaction while on the surface treatment tray. The lenses may then be transferred using the inventive transfer tray for further processing such as polymer coating, extraction, hydration, or packaging, for example.

Those skilled in the art have long recognized the need for modifying the surface of hydrophobic contact lenses so that they are compatible with the eye. It is known that increased hydrophilicity of the contact lens surface improves the wettability of the contact lenses. This, in turn, is associated with improved wear comfort of contact lenses. Additionally, the surface of the lens can affect the lens susceptibility to deposition, particularly protein and lipid deposition from the tear fluid during lens wear. Accumulated deposition can cause eye discomfort or even inflammation. In the case of extended wear lenses, the surface is especially important since extended wear lenses must be designed for high standards of comfort over an extended period of time, without requiring daily removal of the lens before sleep. Thus, the regimen for the use of extended wear lenses would not provide a daily period of time for the eye to recover from any discomfort or other possible adverse effects of lens wear.

The patent literature has disclosed various surface treatments for rendering the surface of hydrophobic contact lenses, including those made with silicone materials, more hydrophilic and more wettable, including changing the chemistry of the surface layer, coating the surface, and compounding the polymer with additives that subsequently diffuse to the surface.

Silicone lenses, in particular, have been subjected to plasma surface reaction to improve their surface properties, e.g., surfaces have been rendered more hydrophilic, deposit resistant, scratch resistant, and the like. Examples of common plasma surface reactions include subjecting the contact-lens surfaces to plasma of an inert gas or oxygen (see, for example, U.S. Pat. Nos. 4,055,378; 4,122,942; and 4,214,014); various hydrocarbon monomers (see, for example, U.S. Pat. No. 4,143,949); and combinations of oxidizing agents and hydrocarbons, e.g., water and ethanol (see, for example, WO 95/04609 and U.S. Pat. No 4,632,844). Sequential plasma surface treatments are also known such as those comprising a first reaction with a plasma of an inert gas or oxygen, followed by a hydrocarbon plasma (see, for example, U.S. Pat. Nos. 4,312,575 and 5,326,584).

Another type of chemical surface modification that has been disclosed in the patent literature involves the introduction of functional groups absent in the parent polymer by the grafting or immobilization of molecules, oligomers, or polymers onto a surface. Grafting or immobilization typically involves, first, the formation of a grafting site which may comprise the formation of a radical by means of chemical reactions, UV irradiation, ionizing radiation, plasma reaction, or the like. The next step is the reaction of the species to be grafted or immobilized with the active site. Surface grafting typically involves the propagation of the reaction to form an anchored chain, wherein competing solution and interfacial reactions occur. Surface crosslinking may occur.

Non-plasma techniques for forming a coating have been disclosed. For example, U.S. Pat. No. 3,814,051 to Lewison discloses vacuum bonding a uniform hydrophilic quartz surface to a contact lens by vaporizing quartz, namely silicon dioxide, within a high vacuum chamber. The coating of contact lenses by dipping, swabbing, spraying or other mechanical means has been disclosed in U.S. Pat. Nos. 3,637,416 and 3,708,416 to Misch et al. The latter patents disclose a chemical process in which a coupling film-forming organic silicon compound, a vinyl trichlorosilane, is applied to a silicone surface, followed by a silica or silica gel deposit formed by contact with a silicon halide such as tetrachlorosilane or with a silicic ester, more particularly a tetraalkoxysilane.

In all of the above treatments, it is important that the surface area of the object being treated be uniformly coated. In particular, lenses that undergo coating or surface treatment need to be supported on a fixture or device which allows the entire lens surface to be coated evenly as possible. One such device is disclosed in U.S. Pat. No. 5,874,127 (Winterton et al). In Winterton et al., the contact lens is supported by a plurality of point-contact support locations. The support locations are sufficient to support the lens to be treated but do not prevent uniform coating of the lens.

Another such device capable of supporting lenses during surface treatment is disclosed in U.S. patent application Ser. No. 60/163,208 entitled "MESH TRAY" (assigned to Bausch & Lomb Incorporated, the entire contents herewith incorporated by reference). This tray comprises a mesh insert which is supported by a rigid, preferably metal tray. Plasma or any gaseous atmosphere may circulate within the mesh insert to uniformly coat the lens.

Material handling devices are known in the field of contact lens manufacturing. For instance, as shown in FIGS. 1–3 (prior art), a perforated tray assembly is used to transport mold assemblies between stations after casting (tray assembly 1 holding mold assemblies 5 shown in FIG. 3). The tray assembly has top portion 2 and base portion 4. Top portion 2 has a series of openings 2a which when assembled, rest on the lower portion 6a of upper mold 6. Base portion 4 also has a series of openings 4a but the openings are smaller than openings 2a and have a counterbore area 4b to correspond to outer diameter 7a of lower mold 7. Mold assembly 5 has upper mold portion 6 and lower mold portion 7. When assembled, mold assembly 5 rests on lower tray portion 4 and is secured in place by top tray portion 2. The upper mold portion 6 protrudes through opening 2a of top tray portion 2. This perforated tray assembly 1 allows mold assembly 5 to remain coupled while mold assembly 5 is transferred between stations.

Lenses are removed from the mold and edged, if necessary. The lenses are now ready for additional processes such as coating or surface treatment.

As previously mentioned, plasma reaction is a common surface treatment and has typically been a two-staged process.

In one prior art method, contact lenses requiring surface treatment are dry-released from the anterior mold and edged polished, if necessary. The lenses are placed manually by a worker concave-side up into a transfer tray. The transfer tray contains a plurality of cylindrical cavities with flat bottoms and is typically made from white polystyrene having a matte finish. The lens diameter is typically smaller than the diameter of the cavity so that the lens is easily placed and retrieved from the tray. The lenses are taken to a different workstation for surface treatment. At the surface treatment station (e.g. using commercial Metroline Plasma Deposition Model Number 7100 Series Chamber), lenses are inverted onto a surface treatment tray such as the removable shelf supplied with the Metroline Plasma Chamber. The Metroline shelf has a plurality of small, spaced perforations located at predetermined intervals, each of the perforations having diameters substantially smaller than any one of the lenses. Each lens is placed on the shelf, concave-side down. The lenses are plasma reacted and inverted, e.g. using a manual method or using a semi-automated device such as an air knife as disclosed in U.S. Pat. No. 5,503,515 (Moorehead, assigned to Bausch & Lomb Incorporated). Unfortunately, it has been found that when lenses are initially inverted from the transfer tray onto the Metroline shelf, placement of the lenses is random with the individual lens not necessarily over a perforation as intended. If an individual lens is not situated over a perforation, the lens will not invert. Instead, a worker must use tweezers to turn the lens over. The other side of the lens is then subjected to a plasma reaction. The surface treatment requires two cycles of plasma reaction. The lenses are then picked up by a worker using tweezers and transferred for other processing such as extraction. The worker is integral to this whole process, especially in making sure all the lenses invert over the air knife and transferring the surface treated lenses for extraction.

Small, delicate work pieces such as contact lenses are difficult to transfer. In the dry state, a contact lens is fragile and prone to scratching, cracking and breaking. Manipulating a contact lens into a desired orientation, such as having the concave side of the lens facing upward or toward a particular direction, can be difficult. The lens is extremely lightweight and can accumulate static charge. Usually, this lens is manually manipulated. A worker may have to turn the lens with a pair of tweezers. Inevitably, a few lenses are damaged by the tweezers or the worker is exposed to repetitive motions, contributing to injuries. It has therefore been desirable to automate as much of the contact lens manufacturing process as possible.

SUMMARY OF THE INVENTION

The present invention is directed to a method of handling and transferring small, delicate articles such as ophthalmic lenses between stations and during certain manufacturing process such as coating/plasma reaction processes. In particular, this invention provides a method of inverting lenses to place the lenses in correct position for surface treatment. The invention also discloses devices in the form of trays for supporting the lenses during processing and surface treatment. In particular, one device allows for a single cycle surface treatment when previously, two cycles were necessary.

In the first aspect, the present invention is directed to a transfer tray for containing lenses during movement from workstation to workstation. After the lenses are released from the mold assembly and if necessary, edged, they are placed onto a transfer tray concave-side up. The transfer tray is rigid and has numerous cavities formed for containing the lenses.

The transfer tray is then secured within a holding frame of an inverting device. The inverting device causes the transfer tray to rotate around an axis such that the tray, containing the lenses, is essentially inverted. The lenses are now concave-side down and resting on a surface treatment support tray, The surface treatment support tray allows for unrestricted surface access in any gaseous type of surface treatment.

The surface treatment support tray is rigid and has a plurality of through-holes formed therein. On one surface of the tray is a shallow counterbore ring around each through-hole. The counterbore ring is slightly larger than the outer perimeter of a contact lens or intraocular lens while the through-hole is slightly smaller than the diameter of the lens. There is no masking of any portion of the lens surface.

In yet a further aspect of the invention, support trays may be affixed onto a larger tray such that multiple support trays are processed at one time. Examples of suitable larger trays include those used in plasma reaction chambers.

Advantages of the present invention include the reduced demand on a worker including less manipulation and handling of the lenses with tweezers which frequently destroy lenses which then must be scrapped. The inverting process is more precise, resulting in placement of the lenses in correct orientation and spacing into the next tray. The placement of the lenses is always precise and does not require the use of an air knife such as that disclosed in Moorehead. The surface treatment process can furthermore be performed in a single-cycle as opposed to a two-cycle process, reducing the time necessary for treating the lenses. Additionally, the lenses are directly transferred from a surface treatment tray into an apparatus for extraction.

BRIEF DESCRIPTION OF THE DRAWING

FIG. 4 is a top plan view of a transfer tray having a plurality of cavities;

FIG. 6 is a top plan view of an inverting device used to transfer lenses from a concave-side up position to a concave-side down position;

FIG. 7 is a side, elevational view of FIG. 6;

FIG. 9 is a cross-section elevational view taken along line 9—9 of FIG. 8;

FIG. 10 is a partial, enlarged view of FIG. 9 showing details of the placement of contact lenses on the surface treatment tray;

DETAILED DESCRIPTION OF THE INVENTION

Figure 1:
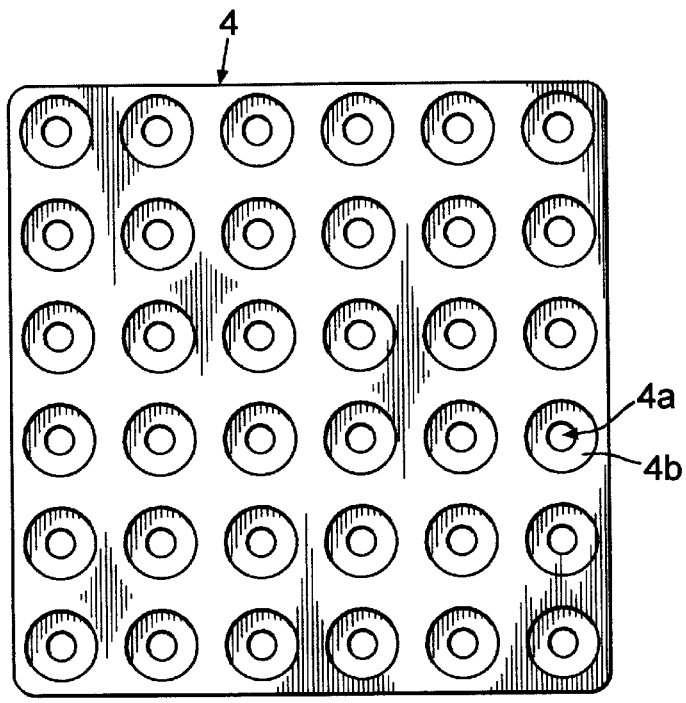
FIG. 1 is a top plan view of the base portion of a prior art tray assembly used to transport contact lenses.
Figure 2:
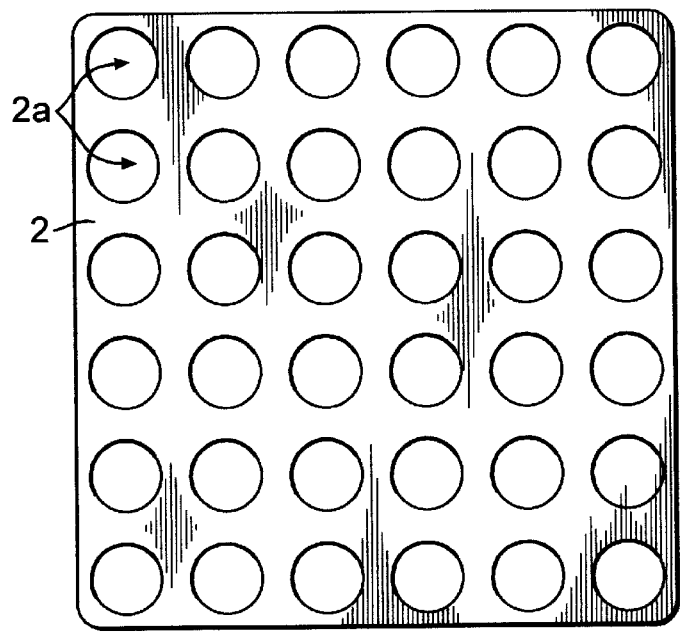
FIG. 2 is a top plan view of the top portion of the tray assembly as seen in FIG. 1.
Figure 3:
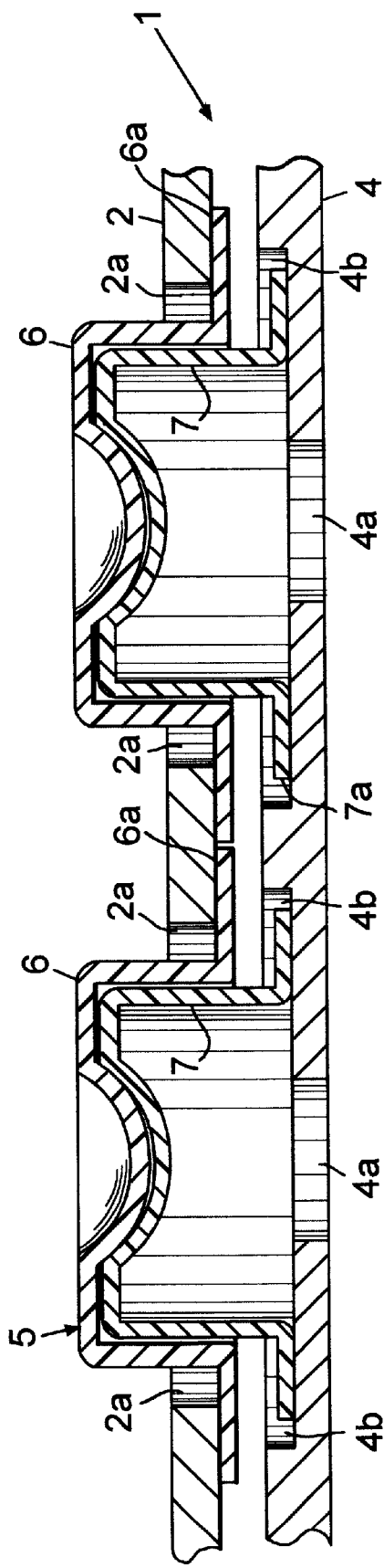
FIG. 3 is a cross-section elevational view of a prior art assembly containing contact lens molds and lenses therein.

As previously stated, small articles such as contact lenses or intraocular lenses may be difficult to process for various reasons. By automating or removing the need for individual manual lens handling, more lenses can be processed and treated without worker involvement. The present invention will be discussed in relation to contact lenses with the understanding that other ophthalmic lenses may be used with the present invention. In particular, intraocular lenses may be processed with the present invention. Other applications may include use of the deposition tray with spectacle lenses, especially if the spectacle lens requires a coating or deposition treatment.

While the following embodiments illustrate contact lenses, any ophthalmic lens may be transferred using this invention.

In the present invention, the dried contact lenses are removed from the mold in which they were cast (see, e.g., U.S. Pat. No. 5,969,793 to Dobner, assigned to Bausch & Lomb Incorporated, the entire contents herewith incorporated by reference), edged (if desired) and placed on transfer tray 10 (tray shown in FIGS. 4 and 5). Up to 50 contact lenses fit onto transfer tray 10, concave-side facing up, although the tray dimensions may be changed as desired to accommodate any number of lenses. Each cavity 12 holds a single contact lens.

Transfer tray 10 has fifty cavities 12 arranged in a predetermined array. As seen in the cross-sectional view, cavities 12 each have a spherical radius for holding the contact lens (contact lens not shown). The convex side of a contact lens, which faces down, is comprised of spherical radii. This allows the contact lens to sit in cavity 12.

Transfer tray 10 has upper surface 14, lower surface 16, corners 26, two attachment sides 18, 18', two lateral sides 20, 20' and alignment means 24 (which will be detailed later). Corners 26 and areas 22, 22' (areas 22, 22' adjacent to lateral sides 20, 20', respectively) are positioned below upper surface 14.

Figure 5:
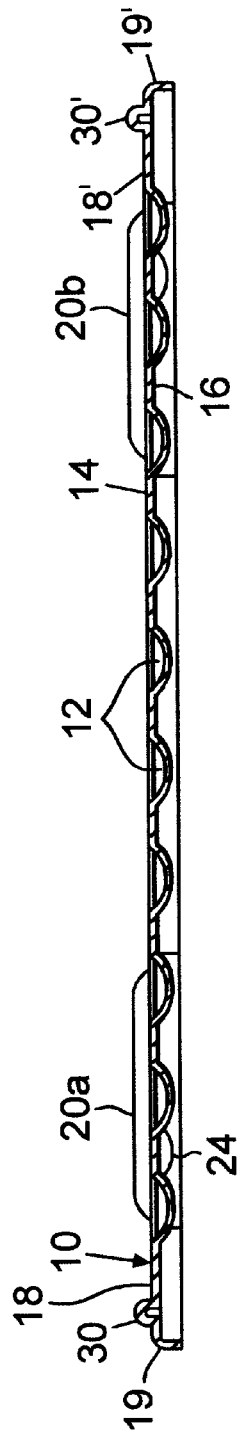
FIG. 5 is a cross-section elevational view taken along line 5—5 of FIG. 4.

As shown in FIG. 5, attachment sides 18, 18' have edges 19, 19', respectively.

Adjacent to edge 19, 19' are raised portions 30, 30', respectively. Lateral sides 20, 20' each have two raised portions 20a, 20b, 20'a and 20'b, respectively (20a' and 20b' shown in FIG. 4). The height of 30, 30', 20a, 20b, 20'a and 20'b are similar. Multiples of tray 10 may be stacked upon each other, with the lower surface 16 separated from upper surface 14 by raised portions 30, 30', 20a, 20b, 20'a and 20'b. This leaves sufficient space between upper surface 14 and bottom surface 16 so that any article contained in cavities 12 of first tray 10 does not contact any portion of the next tray 10 when multiple trays are stacked on top of each other. Transfer tray 10 may be made from any moldable material, metal or ceramic material. In particular, due to the ability of dry contact lenses to collect static charge, it is preferred that when transfer tray 10 is utilized for transferring contact lenses, a non-static material be used. Examples of suitable materials include polyethylenes including HDPE and UHDPE's, polypropylene, polybutylene, polystyrenes including styrene-butadienes, styrene-acrylonitriles, acrylonitrile-butadiene-styrenes, maleic annhydride-styrenes, polyvinylchlorides, acrylics such as polymethylmethacrylate, cellulosics including cellulose acetate, cellulose acetate butyrate, cellulose proprionate, acetals such as polyoxymethylenes, polyamides including polyamide-imides, polycarbonates, polyarylates, polyesters, polyetherimides, polyphenyleneoxides, silicon dioxide, silicon nitride, silicon carbide, silicon-aluminum-oxynitride, aluminum titanate, zirconia toughened aluminum, cermets-ceramic/metal composites, aluminum and aluminum alloys, silver and silver alloys, copper and copper alloys, magnesium and magnesium alloys, tin and tin alloys, nickel and nickel alloys, gold and gold alloys, and titanium and titanium alloys. In particular, a material such as white polystyrene contains sufficient moisture to retain the lenses on the tray. Use of a static-prone material may allow the dry contact lenses to "jump off" the tray due to static charge.

Multiples of transfer tray 10 may be stacked upon each other, thereby allowing the worker to transfer large amounts of lenses in a single move.

Inverting device 40 as shown in FIGS. 6 and 7 has two portions, holding frame 60 and base plate 80. Holding frame 60 is connected to base plate 80 by rotating means 90 such that holding frame 60 pivotally rotates about axis Y—Y onto base plate 80.

Holding frame 60 is comprised of an upper surface 62, lower surface 66, two lateral portions 70,70', two frame portions 74, 74' and clamps 75. Lateral portions 70, 70' have upper portions 71, 71' and lower portions 72, 72'. The lower portions 72, 72', along with upper portions 71, 71' form a recessed area for holding transfer tray 10. Lateral portion 70 is connected to frame portion 74, which is connected to lateral portion 70', which is connected to frame portion 74', which is connected to lateral portion 70; this forms the rectangular frame of holding frame 60. Interior area 78 is open.

Legs 76 on lower surface 66 support holding frame 60 when inverting device 40 is in an open position, when transfer tray 10 is being secured to holding frame 60 and when base plate 80 has been rotated over above holding frame 60.

Figure 11:
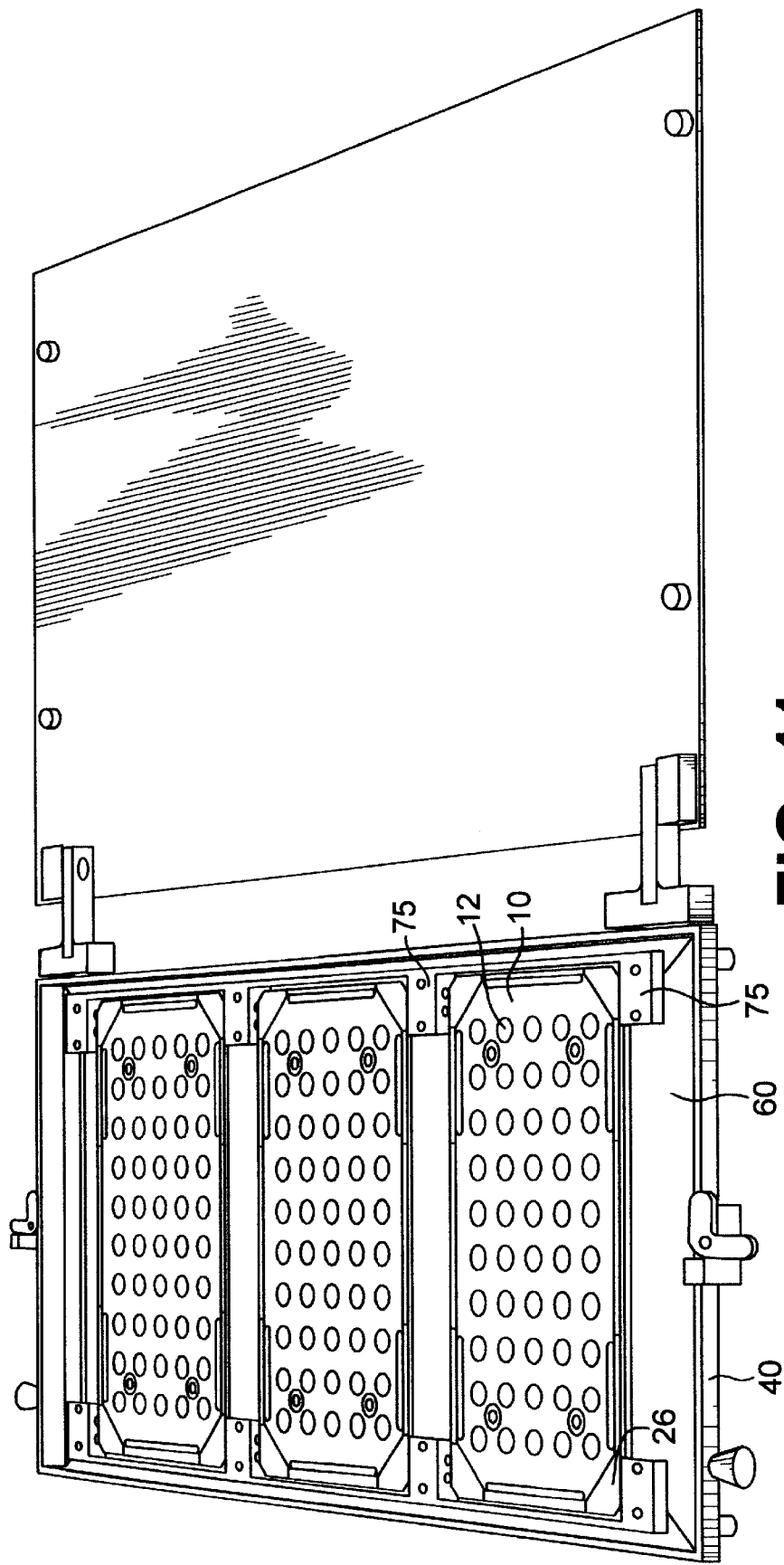
FIG. 11 is a perspective view of multiple transfer support trays secured within the holding frame of the inverting device with contact lenses concave-side up.

On lateral portions 70, 70' there are attached clamping devices 75 which are used to secure transfer tray 10 to holding frame 60. Lower surface 16 of transfer tray 10 rests on the recessed area formed by lower portions 72, 72' (not shown). While any releasable clamping device may be used, especially preferred is a spring-ball plunger clamp which secures transfer tray 10 in place on holding frame 60. It is preferred that transfer tray 10 be easily and smoothly secured into place on holding frame 60 so as to not jar the lenses held in cavities 12. While any number of transfer trays 10 may be secured to holding frame 60, it is preferred that at least two transfer trays be releasably attached to holding frame 60. It is especially preferred that three transfer trays be attached to holding frame 60. This would allow up to 150 lenses to be inverted from transfer tray 10. FIG. 11 illustrates placement of three trays onto holding frame 60.

Returning to FIGS. 6 and 7, base plate 80 has upper surface 84 and lower surface 86. Base plate 80 has a similar shape to that of the holding frame (such as a rectangular shape). On upper surface 84 are located stops 82, preferably on the outer perimeter of the rectangle. Stops 82 provide space between base plate 80 and holding frame 60 when holding frame 60 has been rotated over onto base plate 80, sandwiching transfer trays 10, surface treatment support trays 100 or similar devices therebetween. This can be seen in FIG. 15.

Rotating means 90 provides means for rotating holding frame 60 about axis Y—Y. While any type of hinge or rotating device may be used, it is especially preferred that rotating means 90 has two portions, pivoting member 92 and stationary member 94. Pivoting member 92 is attached to holding frame 60 and is attached to stationary member 94 located on base plate 80 by connecting means 98. Connecting means 98 can be any device which extends through openings in both pivoting member 92 to stationary member 94. A preferred means for connecting pivoting member 92 to stationary member 94 is a cylindrical bolt or a screw. In transferring articles such as contact lenses from a receptacle secured to holding frame 60 to a receptacle secured to base plate 80, base plate 80 remains stationary on a surface while holding frame 60 pivots about axis Y—Y.

Additionally, holding frame 60 may have a means for manipulating the frame in the form of a handle. As shown in FIG. 6, there are located on portions 74 and 74', two handles 73, 73'. While the location of handles is not critical, for ease of movement it is desired that handles be located such that they facilitate movement about axis Y—Y which is shown in FIG. 6.

Figure 13:
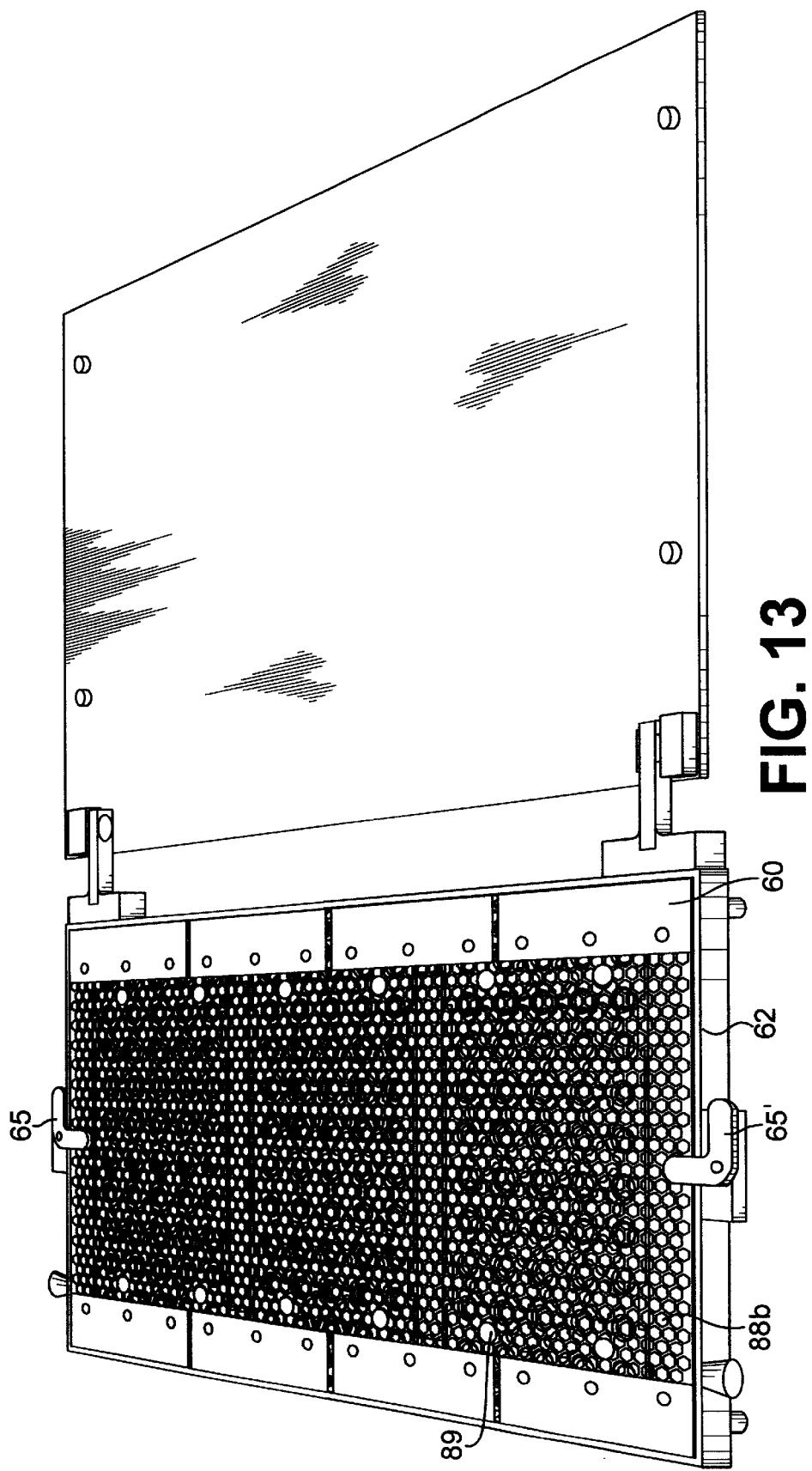
FIG. 13 is a perspective view of the surface treatment trays/perforated tray assembly as it is placed over the transfer trays/holding frame assembly of the inverting device.

Also located on holding frame 60 are locking devices 65, 65'. In the preferred embodiment, locking devices 65, 65' pivot, releasable holding any type of elongated tray placed over holding frame 60. This is shown in FIG. 13.

Figure 8:
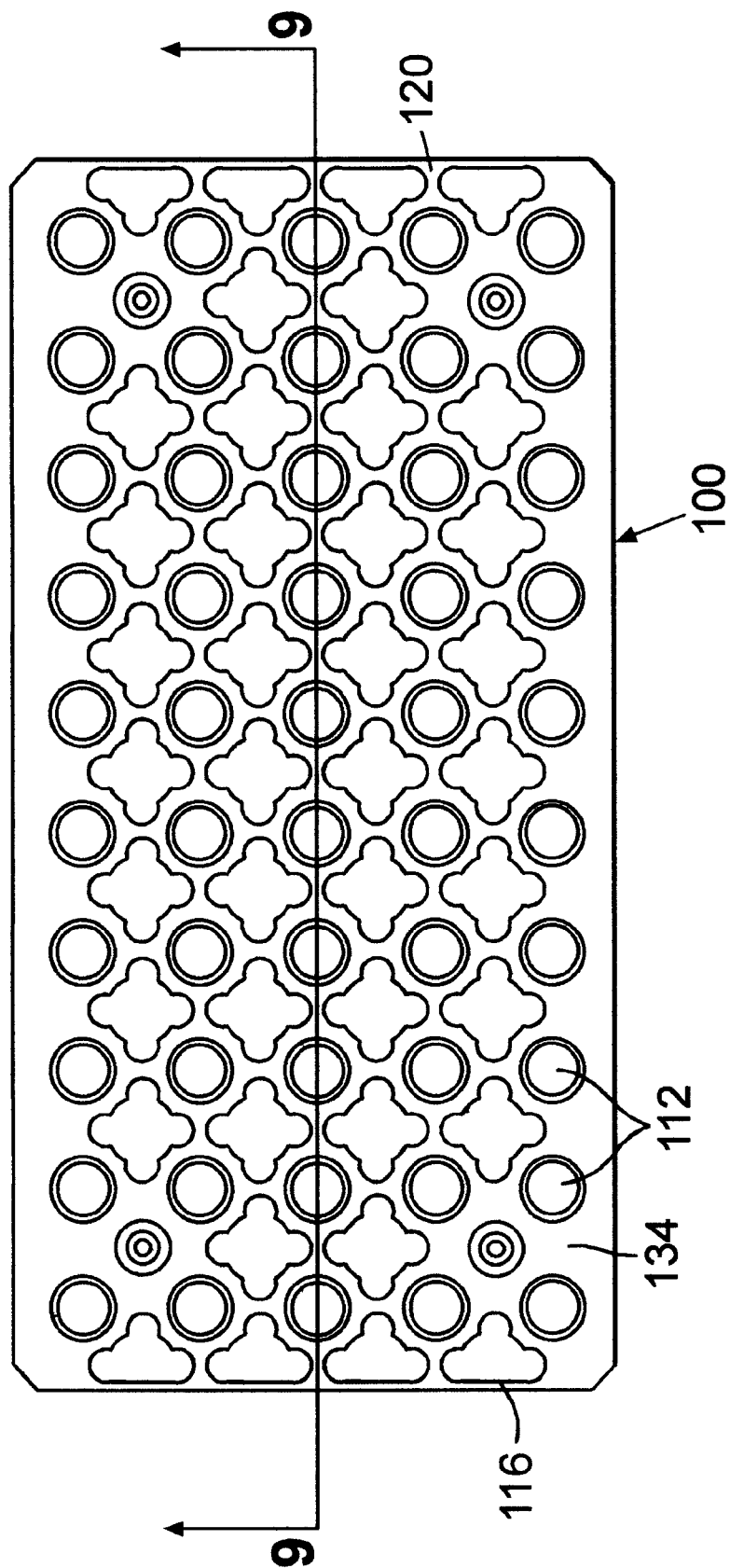
FIG. 8 is a top plan view of a surface treatment tray.

FIGS. 8–10 illustrate a surface treatment support tray having multiple through-holes for holding contact lenses. Ophthalmic lenses may be processed while being retained in trays. Such processes may involve surface treatment such as plasma reaction, including plasma oxidation, plasma polymerization or plasma deposition.

FIG. 8 illustrates surface treatment support tray 100 from a top plan view. The support tray 100 has multiple through-holes 112. Each through-hole 112 is cylindrically shaped as shown in FIG. 8 but other shapes are possible. In the preferred embodiment, support tray 100 has five rows of ten through-holes. Additionally, tray 100 may have other sections removed such as opening 116 in order to optimize gas flow around the lenses. It is preferred that support tray 100 be made from a lightweight, non-ferrous material suitable for use with plasma oxidation, plasma polymerization or plasma deposition. Especially preferred is a material such as aluminum which is not anodized, and thus avoids any surface static charge.

As seen in FIGS. 9 and 10, support tray 100 has upper surface 120 and lower surface 130. Each through-hole 112 has shallow counterbore 114 in the upper surface 120 portion. Counterbore 114 has a circular diameter and circumvents the outer perimeter of through-hole 1 12. Counterbore 1 14 has width sufficient to allow lens 140 to be easily positioned in counterbore 114 with the lens edge 142 resting on counterbore surface 122. It is important that lens edge 142 maintains continuous contact with surface 122 of counterbore 1 14 and does not contact any other portion of tray 100. Preferably, lens 140 is centered over through-hole 112.

Legs 132 are fixed on lower surface 130 of support tray 100. In the preferred embodiment, there are four legs made of an electrically insulating material. Legs 132 keep tray 100 from contacting the interior plasma chamber or shelf. Legs 132 also provide spacing so that any gaseous or liquid coating may be able to freely reach both sides of lens 140 during processing. In the preferred embodiment, legs 132 are made from polycarbonate which insulates the tray from any shelf or plasma chamber surface.

As previously mentioned in the Background of the invention, plasma oxidation, plasma polymerization or plasma deposition can be accomplished in an apparatus such as the Metroline Plasma Deposition Chamber. Large planar support surfaces such as perforated shelves are used to support the articles being treated (Metroline shelf 88 seen in FIG. 12). Feet 132 of surface treatment tray 100 can be affixed to perforated shelf 88 by any attachment means such as screws or hooks. Preferably, legs 132 are hollow and have raised upper surface 134 (upper surface seen in FIGS. 9 and 10). In the preferred embodiment, upper surface. 134 of surface treatment tray 100 matingly engage with attachment means 24 of transfer tray 10. The trays are now aligned such that when inversion occurs, the lenses are transferred from the cavities .12 of transfer tray 10 directly into cavities 112 of surface treatment tray 100. It is possible to position a multiple number of trays 100 onto perforated shelf 88. In the preferred embodiment, at least support trays 100 are attached to the perforated shelf 88. It is especially preferred that three support trays 100 are attached to perforated shelf 88, thereby treating 150 lenses at once.

Since surface treatment support tray 100 allows the plasma to freely access both sides of the lens, it is necessary for the lenses to undergo only a single plasma cycle. The lenses do not have to be inverted or "flipped", and the time required for the process is reduced.

As shown in FIG. 11, multiple transfer trays 10 are secured within the holding frame 60 of the inverting device 40. Each cavity 12 of transfer tray 10 contains a contact lens (lenses not shown). Clamps 75 contact tray corner portion 26 such that trays 10 are smoothly inserted between clamps 75 without jarring contact lenses. Contact lenses are concave-side up as transfer tray 10 is secured to holding frame 60. In the preferred embodiment, multiple transfer trays 10 are secured. It is preferred that at least two and especially preferred that three transfer trays are secured to the holding frame 60. In the preferred embodiment, three transfer trays 10 are attached to the holding frame 60 thereby capable of inverting 150 lenses at once.

Figure 12:
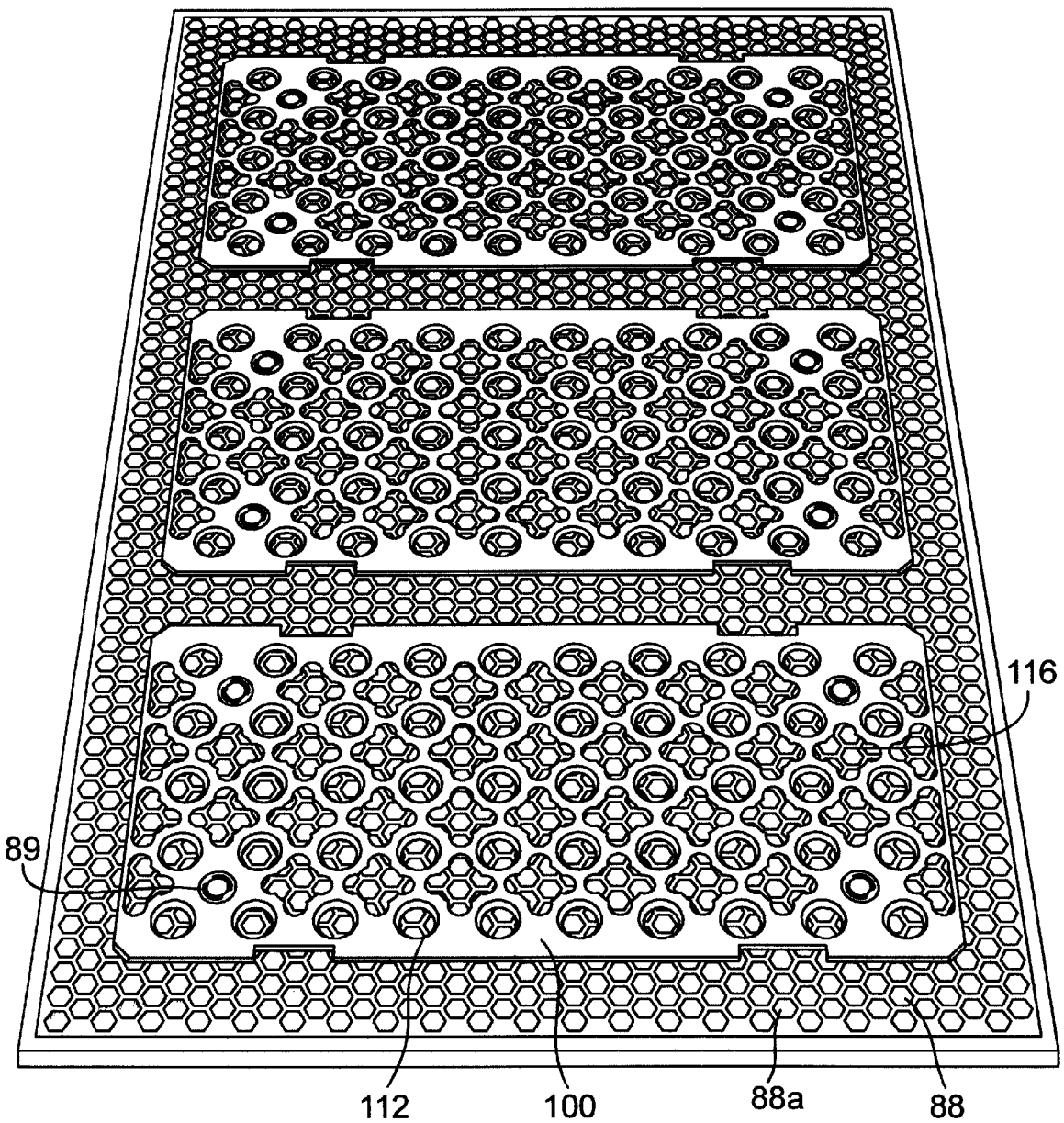
FIG. 12 is a perspective view of multiple surface treatment trays secured to a perforated tray.

As seen in FIG. 12, surface treatment support tray 100 is secured to upper surface 88a of perforated tray 88 by attachment means 89. The number of surface treatment support trays 100 attached to shelf 88 depends on and should correspond to the number of transfer trays 10 attached to holding frame 60. It is critical that both trays be aligned to ensure that the contact lenses are precisely transferred from one tray to the other.

FIG. 13 shows lower surface 88b of perforated shelf 88. Surface treatment tray 100 is attached to shelf 88 and is visible through the perforations of shelf 88. Locking devices 65, 65' secure shelf 88 such that upper surface 88a is adjacent to upper surface 62 of holding frame 60. Directly under surface treatment trays 100 are transfer trays 10 (not shown) such that upper portion 120 of surface treatment support tray 100 is directly over upper portion 14 of transfer tray 10. As previously mentioned, it is necessary for surface treatment support trays 100 to be aligned with transfer trays 10 such that a contact lens in cavity 12 of transfer tray 10 is aligned with cavity 112 of surface treatment tray 100.

In another embodiment, shelf 88 is secured to holding frame 60. In this embodiment, lenses are inverted directly onto perforated shelf 88 and further processed.

Figure 14:
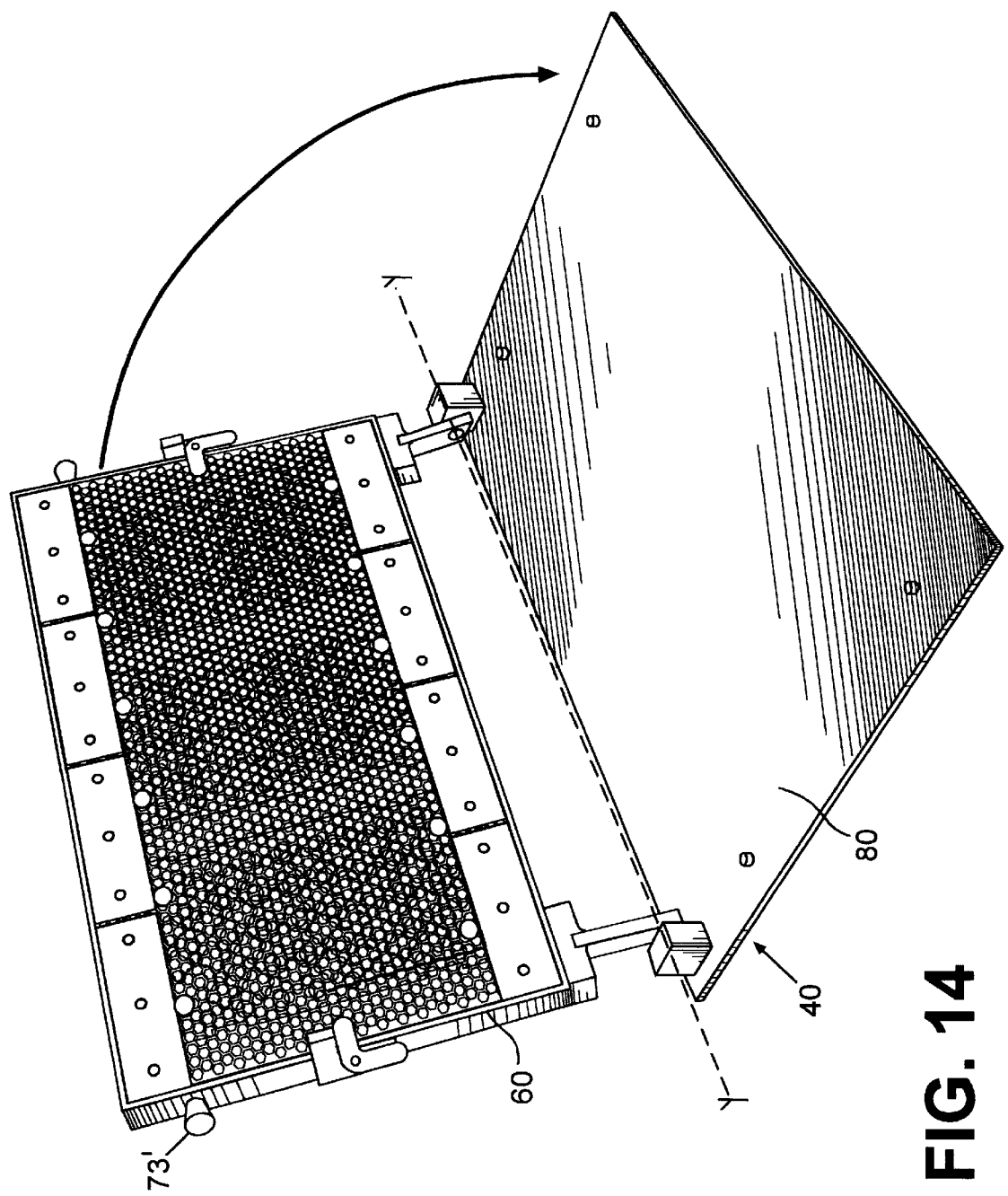
FIG. 14 is a perspective view of the inverting device as the holding frame is rotated about axis Y—Y.

FIG. 14 shows inverting device 40 as holding frame 60 is rotated about axis Y—Y. Lenses (not shown) are held between transfer tray 10 (not shown) and surface treatment support tray 100 (not shown) such that the lenses are secured and stay in place. A worker grasps handle 73', lifting holding frame 60.

Figure 15:
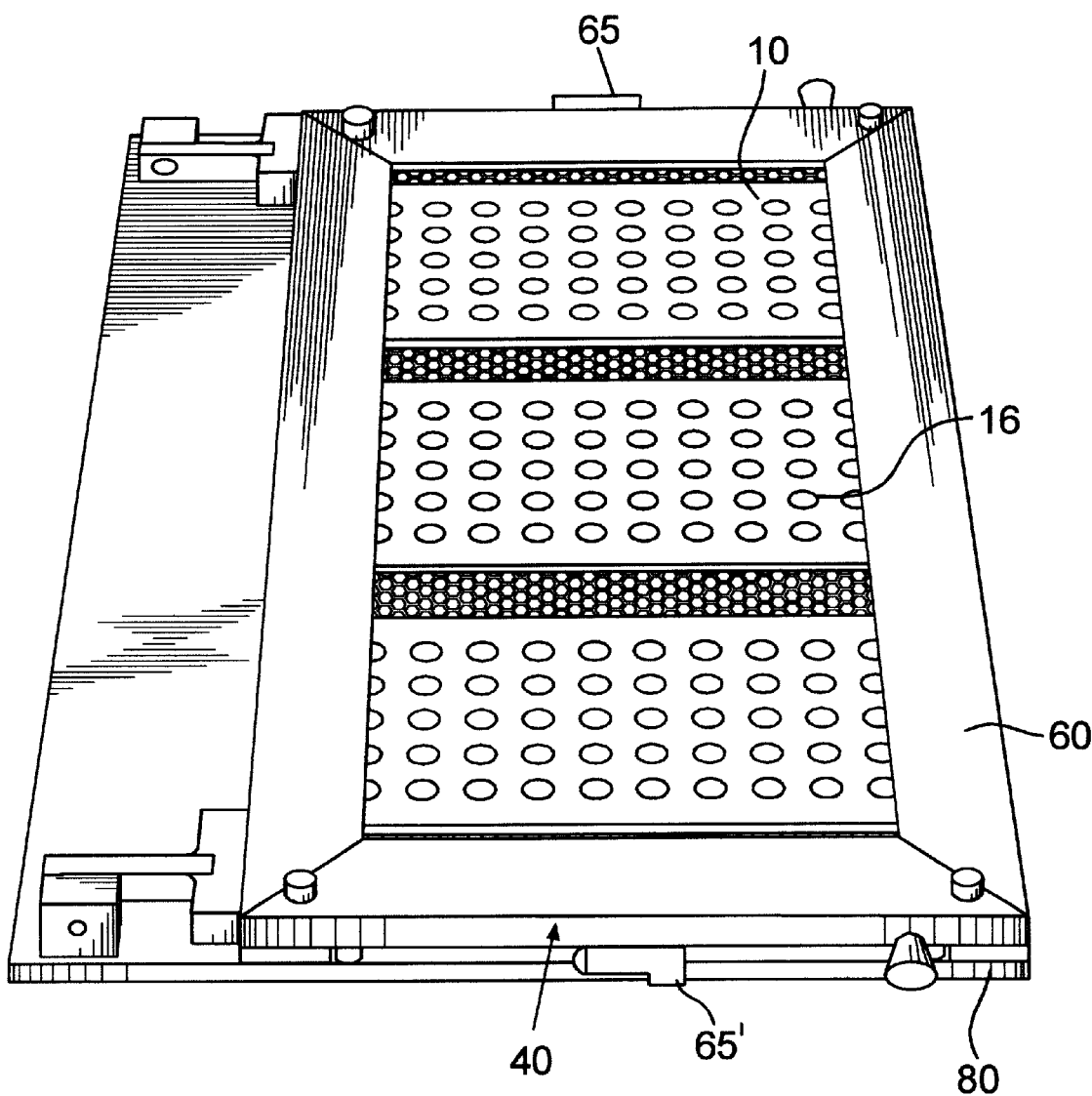
FIG. 15 is a perspective view of the inverting device as rotation of the holding frame is completed onto the base plate.

FIG. 15 shows inverting device 40 as rotation of the holding frame 60 is completed onto base plate 80. Lower surface 16 of transfer tray 10 is now facing upwards. Edges 142 of lenses 140 (not shown) are now resting within counterbore 114 of surface treatment tray 100 (not shown). After the rotation is complete, locking devices 65, 65' are released, thereby releasing shelf 88 to remain on base plate 80 (shown in FIG. 16).

Figure 16:
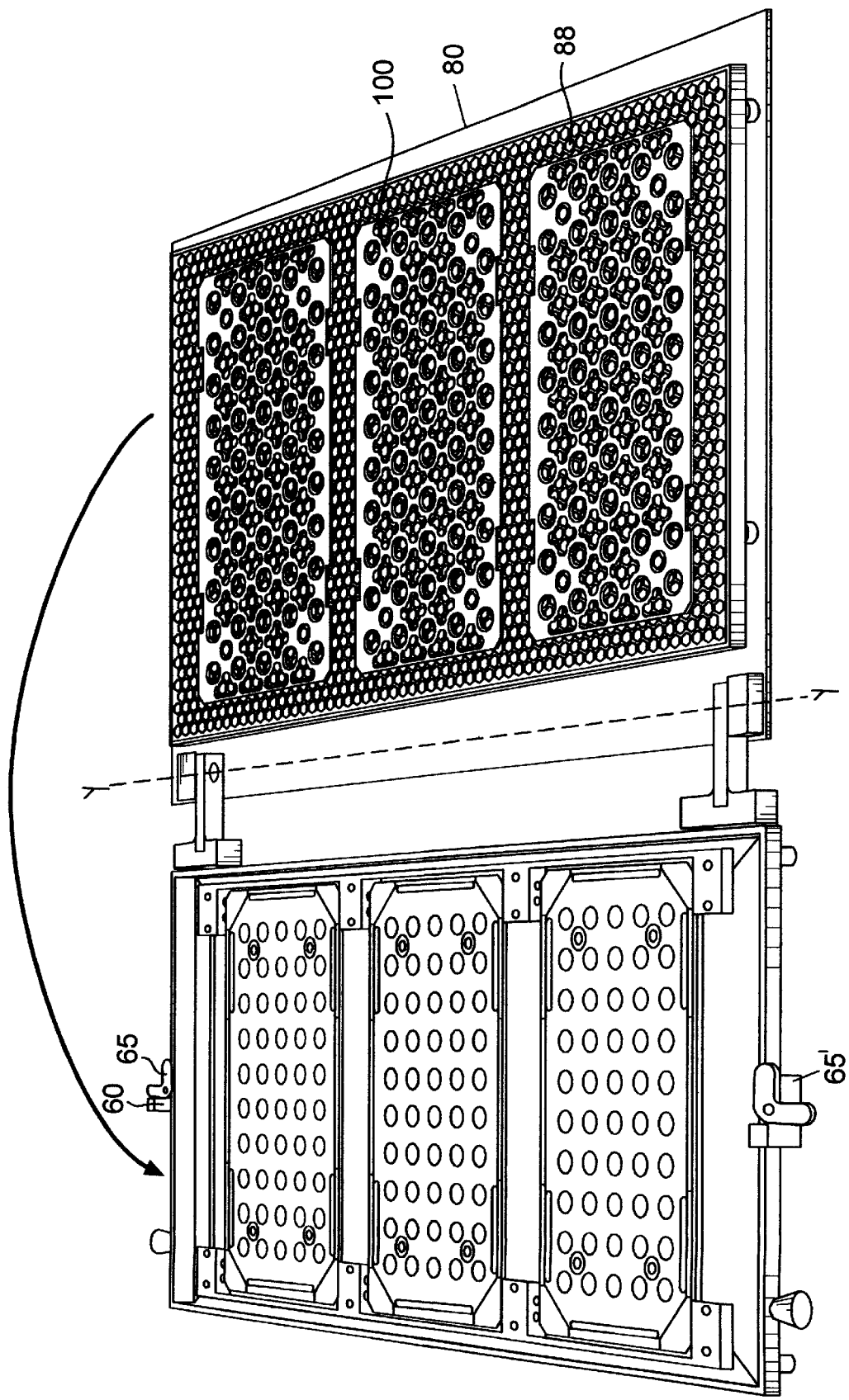
FIG. 16 is a perspective view of the rotation of the holding frame back to starting position after lenses have been transferred to the surface treatment trays in the concave-side down position.

FIG. 16 shows the rotation of the holding frame back 60 about axis Y—Y to starting position. Lenses are now residing in surface treatment support tray 100 and in a concave-side down position.

After reaction, the perforated support tray 88 and trays 100 are removed from the plasma chamber. The lenses are concave-side down and ready for further processing. An example of further processing is extraction and hydration. In particular, perforated shelf 88 is replaced on base plate 80. Mesh extraction inserts such as those disclosed in U.S. Ser. No. 60/163,208 are set over the lenses. Holding frame 60 is rotated over onto the mesh inserts and locked into place over shelf 88. Holding frame 60 is rotated back over such that legs 76 contact the surface. This action transfers lenses into the mesh extraction wells. After placement of mesh top over the insert bottom, the insert assembly is placed into bottom supporting tray portion and covered with the top supporting tray portion. The lenses are now ready to be placed into a carrier and extracted as appropriate. Additional processing of the lenses may include dipping the mesh assembly into a polymer coating solution.

Any type of medical device including ophthalmic lenses may be transferred using the transfer tray, inverting device and surface treatment support tray. Ophthalmic lenses include intraocular lenses, rigid gas permeable and soft contact lenses and spectacle lenses. Preferred lenses are contact lenses which require a surface treatment, including lenses which are fluorosilicone, xerogels or silicone hydrogels. Especially preferred are silicone hydrogel lenses which are treated to render the surface more hydrophilic.

In the preferred embodiment, the lenses are surface treated by plasma oxidation, plasma polymerization or plasma deposition. Examples of plasma reaction methods are disclosed in the following:

U.S. Ser. No. 09/219,500 (Grobe and assigned to Bausch & Lomb Incorporated, the entire disclosure herewith incorporated by reference) discloses treating a fluorinated contact lens with a hydrogen-containing plasma to reduce the fluorine content of the surface layer, followed by oxidation of the surface.

U.S. Ser. No. 09/315558 (Grobe et al and assigned to Bausch & Lomb Incorporated, the entire disclosure herewith incorporated by reference) discloses modifying the surface of a silicone contact lens by plasma reacting the lens with a carbon-containing layer made from a diolefinic compound having 4 to 8 carbon atoms, followed by plasma or chemical treatment of the carbon layer to render it hydrophilic.

U.S. Ser. No. 09/315,306 (Valint et al and assigned to Bausch & Lomb Incorporated, the entire disclosure herewith incorporated by reference) discloses plasma reacting the surface of a silicone contact lens with a carbon layer followed by attachment of hydrophilic polymer chains to the surface of the carbon layer.

U.S. Ser. Nos. 09/295,651 and 09/295,675 (both to Valint et al and assigned to Bausch & Lomb Incorporated, the entire disclosures herewith incorporated by reference) disclose plasma reacting the surface of a silicone contact lens to form a silicatecontaining coating. The surface modified lens shows desirable coating characteristics even after extraction, hydration and sterilization.

Additionally, U.S. Ser. No. 09/315,912 (Grobe et al and assigned to Bausch & Lomb Incorporated, the entire disclosure herewith incorporated by reference) discloses coating a silicone lens with plasma deposition of a carbon layer, functionalizing the carbon layer followed by graft polymerization of a hydrophilic polymer onto the carbon layer. In the preferred embodiment, a silicone contact lens surface is pretreated with an oxidizing plasma prior to deposition of the carbon layer, in order to improve adhesion of the carbon layer.

By using multiple transfer and surface treatment trays and the device for transferring contact lenses, the number of lenses processed can be increased dramatically. By using the above-described surface treatment tray, lenses can be plasma reacted in a single cycle whereas previous methods required two cycles.

We claim:

1. Apparatus for transferring and inverting a plurality of concave-convex lenses from a transfer tray wherein said lenses are in a concave side-up position, to a surface treatment support tray wherein said lenses are in a concave side-down position, said apparatus comprising:
   a) an inverting device having a holding frame and a base plate which are pivotally attached together and movable between an open, substantially co-planar position and a closed position wherein said holding frame and base plate are in stacked relation to each other, said holding frame including clamping means for releasably clamping said transfer tray thereto; and
   b) a perforated shelf and means for releasably securing said surface treatment support tray thereto, said holding frame further including one or more locking devices for releasably locking said surface treatment support tray and said perforated shelf thereto in covering relation to said transfer tray, whereby said holding frame including said transfer tray, said surface treatment support tray and said perforated shelf, is pivoted over and onto said base plate whereupon said lenses drop from said transfer tray onto said surface treatment tray in a concave side-down position.

2. The apparatus of claim 1, wherein each of said lenses includes a peripheral edge and wherein said transfer tray includes an array of cavities into which said lenses are removably positioned in a concave side-up position, respectively, and wherein said surface treatment support tray includes an array of through-holes each having a surrounding counter-bore surface against which the peripheral edge of a respective said lens rests upon being positioned thereon in said concave side-down position through said pivoting of said holding frame onto said base plate, and wherein said transfer tray and said surface treatment support tray include cooperative alignment means such that said cavities in said transfer tray align with said through-holes in said surface treatment support tray, respectively.

3. The apparatus of claim 1 wherein said inverting device is configured to releasably engage a plurality of said transfer trays in side-by-side relation on said holding frame, and a like plurality of said surface treatment support trays removably positioned in covering, stacked relation to said transfer trays, respectively.

4. The apparatus of claim 1 wherein said perforated tray is a removable component of a lens surface treatment device whereby said surface treatment tray with said lenses positioned thereon in said concave side-down position and said perforated tray, to which said surface treatment tray is removably attached, may be inserted as a unit into the lens surface treatment device.

5. A method for inserting and transferring a plurality of concave-convex lenses from a first work station to a second work station, said method comprising the steps of:

a) providing a transfer tray having a plurality of cavities formed therein and placing one of said lenses in each of said cavities with said lenses lying in a concave side-up position therein;

b) providing a lens inverting device having a holding frame connected to a base plate wherein said holding frame and said base plate are movable with respect to one another between an open, side-by-side position, and a closed, stacked position;

c) providing a lens treatment device having at least one perforated shelf removably positioned therein, removing said perforated shelf from said lens treatment device and releasably securing said perforated shelf to said holding frame in covering relation to said transfer tray and said lenses positioned in a said cavities;

d) pivoting said holding frame and said base plate to said closed, stacked position with said transfer tray becoming located above said perforated shelf whereby said lenses drop from said cavities and onto said perforated tray in a concave side-down position;

e) moving said inverting device to said open position with said holding frame and said transfer tray secured together, and said base plate with said perforated shelf and said lenses lying in covering relation to said base plate;

f) removably inserting said perforated shelf including said lenses thereon in said lens treatment device; and g) activating said lens treatment device whereby said lenses are surface treated.

6. The method of claim 5 and further comprising the step of providing a surface treatment support tray and removably securing said surface treatment support tray to said perforated shelf prior to attaching said perforated shelf to said holding frame with said surface treatment support tray positioned immediately adjacent said transfer tray and said lenses.

7. The method of claim 6 wherein said surface treatment support tray includes a plurality of counter-bores encircling and defining a respective plurality of through-holes which are aligned with said cavities and said lenses upon securing said surface treatment support tray and said perforated shelf to said holding frame, said through-holes having a diameter less than a respective lens.

* * * * *